United States Patent [19]

Buchmann

[11] Patent Number: 4,459,738
[45] Date of Patent: Jul. 17, 1984

[54] SYSTEM FOR EXCHANGING CUTTING TOOLS

[75] Inventor: Kurt Buchmann, Essen, Fed. Rep. of Germany

[73] Assignee: Fried. Krupp Gesellschaft mit beschränkter Haftung, Essen, Fed. Rep. of Germany

[21] Appl. No.: 412,761

[22] Filed: Aug. 26, 1982

[30] Foreign Application Priority Data

Sep. 19, 1981 [DE] Fed. Rep. of Germany ....... 3137427

[51] Int. Cl.³ ............................................. B23Q 3/155
[52] U.S. Cl. ....................................... 29/568; 407/105
[58] Field of Search ................... 29/568; 407/105, 101

[56] References Cited

U.S. PATENT DOCUMENTS

| 3,368,265 | 2/1968 | Kirkham | 29/568 |
| 3,908,255 | 9/1975 | Faber | 407/105 |
| 4,020,545 | 5/1977 | Slavinski et al. | 29/568 |
| 4,038,740 | 8/1977 | Grinage | 29/568 |
| 4,218,816 | 8/1980 | Dormehl | 29/568 |

FOREIGN PATENT DOCUMENTS

| 1602810 | 4/1980 | Fed. Rep. of Germany | 29/568 |
| 3007440 | 9/1981 | Fed. Rep. of Germany | 29/568 |

Primary Examiner—Z. R. Bilinsky
Attorney, Agent, or Firm—Spencer & Frank

[57] ABSTRACT

A system for exchanging a cutting tool of a tool holder which includes a tool having a tool head which carries a cutting element and is provided with a bore. The tool head is removably connected to the tool holder. A spreading cylinder is provided for engaging the bore of the tool head to remove the tool head from the tool holder. The system further includes a magazine having a plurality of locations for receiving tool heads equipped with cutting tools.

4 Claims, 7 Drawing Figures

SYSTEM FOR EXCHANGING CUTTING TOOLS

BACKGROUND OF THE INVENTION

The present invention relates to a system for exchanging the cutting tool of a work tool holder and in particular for exchanging cutting tools used for exterior and interior lathe work on machine tools.

German Offenlegungsschrift (Application Published Without Examination) No. 3,007,440 assigned to the assignee of the present application, discloses a tool for performing cutting work on the interior and exterior of metallic workpieces which includes a tool holder, a tool head and a cutting element wherein the tool holder and the tool head are connected together by means of a plurality of clamping pins which are locked and released by a clamping bolt movable within a cylindrical fitting. The clamping bolt can be moved manually or by machine. Tools of this type utilize different types of cutting elements, in particular, drills and reversible cutting plates, which are each mounted on a tool head. Tool heads are exchanged by the tool head being released by the machine, the tool head removed by means of an automatically controlled gripper and replaced by a different tool head having a further cutting tool.

This tool arrangement however has the drawback that its use is restricted to tools where the tool heads are large compared to the tool bit itself since it is extremely difficult to exchange tool heads which are small compared to the tool bit by means of an automatically controlled gripper with the required degree of reliability and reproduceability.

SUMMARY OF THE INVENTION

It is therefore an object of the present invention to provide a tool arrangement for working metallic and nonmetallic workpieces which includes tool heads (supports) whose size exceeds only slightly the size of the tool bits and in which can reliably be exchanged and accurately positioned in automatic operation.

This is accomplished by the provision of a system which includes a magazine, a movable spreading cylinder, a tool holder having a clamping means mounted in a first recess, a tool head mounted in a second recess of the tool holder by means of the clamping element, and the tool head being provided with a bore intended to receive the spreading cylinder. A cutting element is fastened in a recess in the tool head by means of a clamping member. The magazine has several locations where tool heads, each equipped with a cutting element, can be accommodated. The system according to the invention permits reliable and very quick automatic exchange of cutting tools as well as the use of different cutting tools for different jobs. Due to the fact that the tool heads according to the invention are particularly small compared to the prior art tool heads, they can be accommodated on drilling rods for interior lathe work as well as on larger sized tool holders for exterior lathe work so that the system according to the invention becomes very versatile. By using particularly small tool heads, the entire tool is given optimal rigidity which positively influences the efficiency of the machine tool and considerably reduces the price of the system. The use of a spreading cylinder for the exchange of tool heads according to the invention makes possible a significant and unexpected reduction in the size of the tool head.

In accordance with a further feature of the invention, an abutment plate is disposed in the recess of the tool head and an abutment piece is disposed in the second recess of the tool holder, on which the cutting element and the tool head, respectively, are supported. The abutment plate and the abutment piece can easily be exchanged when they are worn or damaged and thus impart almost unlimited service life to the tool holder and to the tool head.

According to the invention, it is further provided that the clamping element for fastening the tool head in the tool holder engages the tool head in the bore intended to receive the spreading cylinder. This dual function of the bore, namely, receiving the spreading cylinder for the tool exchange of tool heads and receiving the clamping element for fastening the tool head to the tool holder permits a further reduction in the size of the tool head.

The system according to the invention operates as follows. A plurality of tool heads are equipped with different types of cutting elements and are placed into pre-selected locations in the magazine. The movable spreading cylinder is automatically inserted into the bore of one tool head and moves the tool head from the magazine into the tool holder mounted in a machine tool. The tool head is firmly connected with the tool holder by means of a clamping element actuated by an automatically controlled clamping tool. After completion of the work, the connection between the tool head and the tool holder is released by the clamping tool, the movable spreading cylinder engages into the bore of the tool head and the tool head is returned to the magazine. Then the tool holder can be equipped with a further tool head. The various cutting elements are mounted on their respective tool heads such that when the tool heads are inserted in the tool holder and the tool holder positioned in the machine tool, the cutting points of the cutting elements are positioned at a common reference point.

The spreading cylinder may be of the generally known type that has a cluster of fingers which, after their introduction into a bore of an article to be grasped and transported, are radially expanded to frictionally engage and thus clamp against the bore wall. The radially outward expansion and the radially inward retraction of the fingers may be effected by conventional mechanical and/or hydraulic means.

DETAILED DESCRIPTION OF THE PREFERRED EMBODIMENTS

Figure 1:
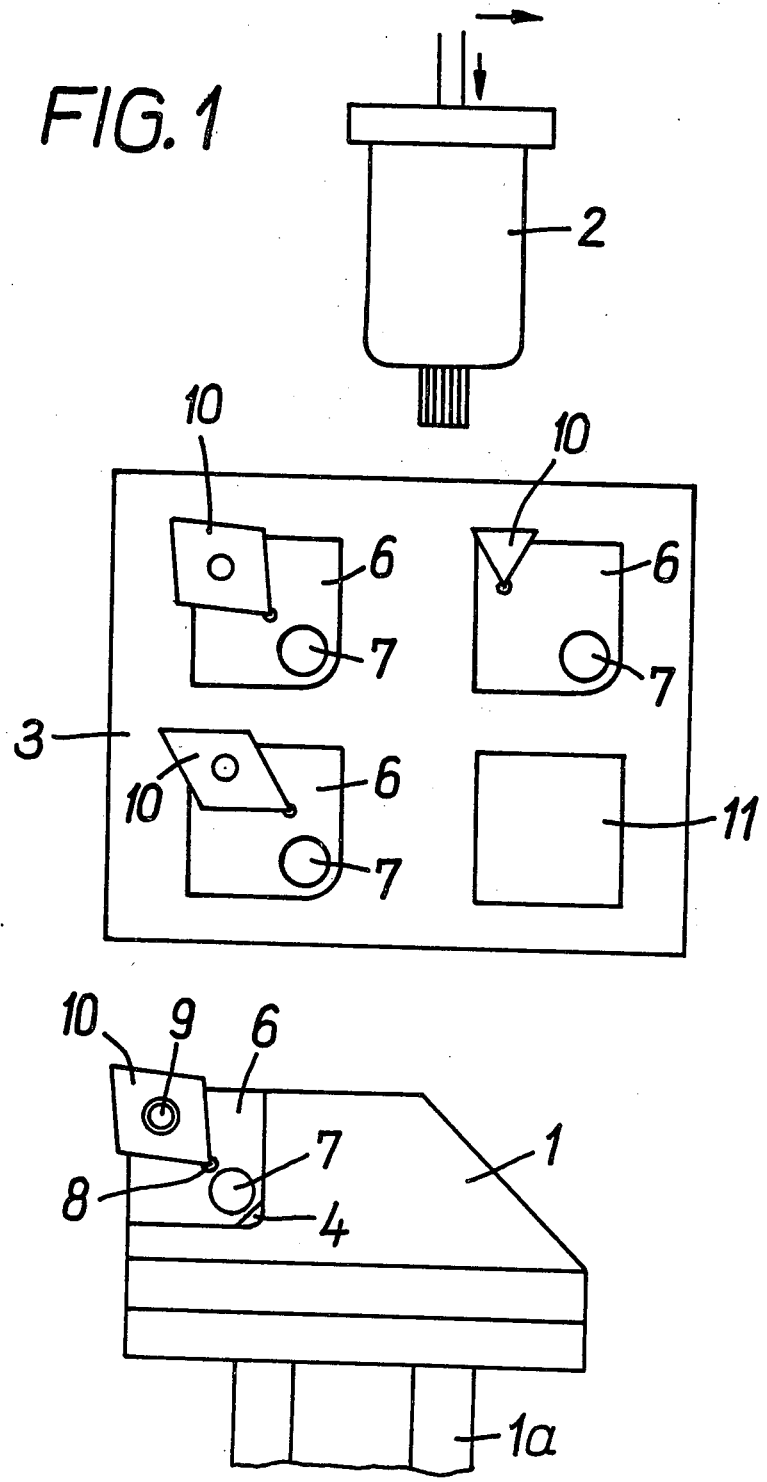
FIG. 1 is a schematic representation of the essential components of the system according to the invention.
Figure 2:
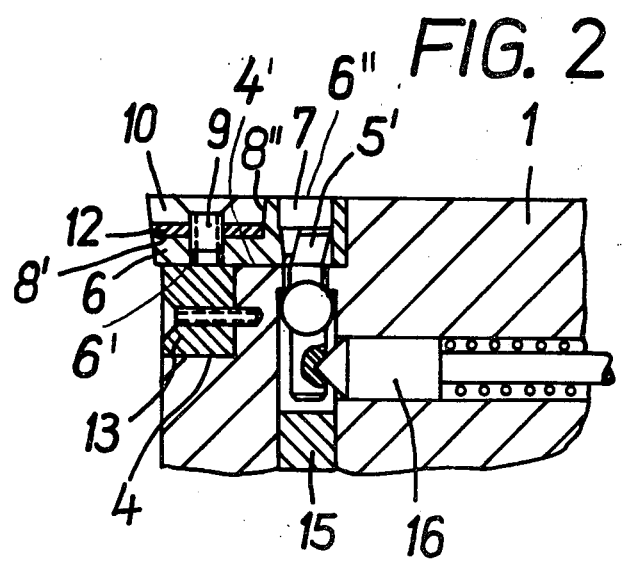
FIG. 2 is sectional side view of a tool holder equipped with a tool head according to the invention.
Figure 3:
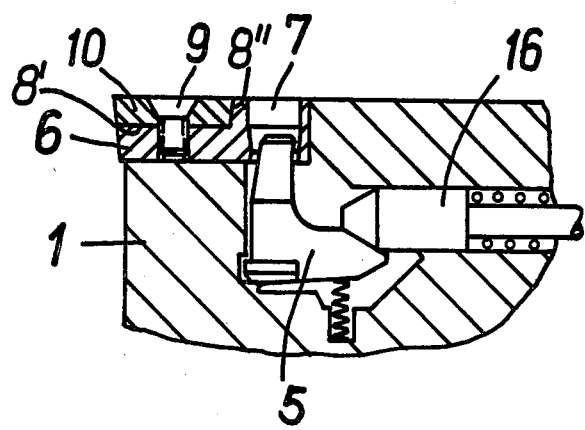
FIG. 3 is a sectional side view of an alternative embodiment of a tool holder with a tool head according to the invention.

The tool holder 1, shown in side perspective view at the lower portion of FIG. 1 and which may be a drilling rod or a head for reversible cutting plates, has a shaft 1a for mounting in a machine tool. In a recess 4 of the tool holder 1 there is disposed a flat tool head 6 which has a bore 7 for engagement with a spreading cylinder 2. Tool head 6 which has a bottom face 6' and, parallel thereto, a top face 6" is firmly seated against a support surface 4' of the recess 4 of the tool holder 1 by means of a bell crank clamping element 5 (FIG. 3) or a straight, two-arm clamping element 5' (FIG. 2). As a further alternative, the clamping element may be an eccentric bolt (not shown). The bore 7 whose axis is oriented perpendicularly to the bottom and top face 6', 6", may extend through tool head 6 into tool holder 1 to also accommodate the clamping element 5 or 5' as shown in FIGS. 3 and 2, respectively. The clamping element 5 or 5' is tightended or released by means of an automatically actuated clamping tool and such tightening may be effected via pressure piece 16. In FIG. 2, the clamping element 5 is secured in bore 7 by a plug 15 which seals the lower portion of the bore 7.

As shown in FIGS. 1, 2 and 3, the cutting element 10 is fastened by the clamping member 9 in a recess 8 of the tool head 6. Recess 8 is in the form of a cut-out portion, the bottom (support surface) and side wall of which are designated 8', 8" respectively. The support surface 8' extends parallel to the bottom and top faces 6' and 6" of the tool head 6. The installation and exchange of the cutting elements 10 is effected manually and clamping member 9 may be a screw or a clamp.

Reversible cutting plates of different shapes as well as tools for drilling and thread cutting may be used as cutting elements 10. The cutting elements 10 are preferably made of a hard metal composed of a binder metal and one or a plurality of hard metal carbides.

As shown in FIG. 2, in order to protect the tool holder 1 against premature wear, the abutment piece 13 may be disposed in the recess 4 so as to support the tool head 6. The abutment piece 13 may be exchanged if worn out thus extending the service life of the tool holder 1.

Figure 4A:
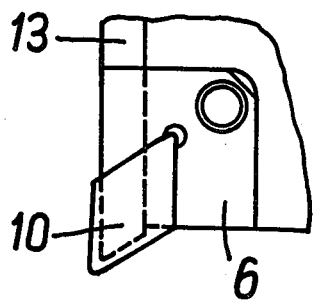
FIGS. 4a, 4b and 4c are top plan views of tool holders equipped with differently shaped cutting elements according to the invention.
Figure 4B:
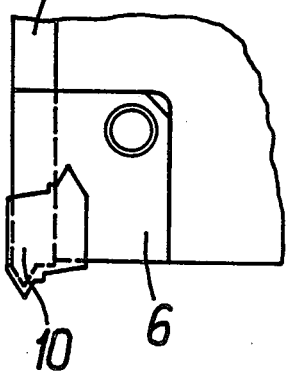
Figure 4C:
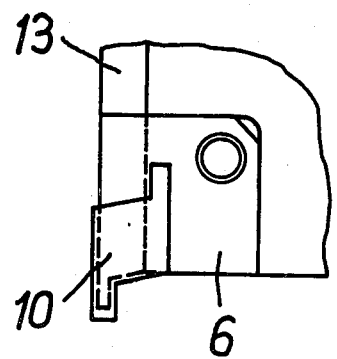

FIGS. 4a through 4c show for example the abutment piece 13 can advantageously be adapted to different shapes of the cutting elements so that optimum support of the tool heads 6 and of the cutting elements 10 occurs during use of the tool.

As shown in FIG. 2, wear on the tool head 6 can be reduced by use of an abutment plate 12 mounted in the recess 8 so as to support the cutting element 10. As in the case of abutment piece 13, abutment plate 12 can be exchanged when worn.

The magazine 3, shown schematically in the center of FIG. 1, has several locations 11 for receiving in a side-by-side arrangement, tool heads 6 equipped with different cutting elements 10. The magazine 3 is coded in a certain manner and can be rectangular or circular in shape. The spreading cylinder 2 can be moved in any direction to displace the tool heads 6 with the various cutting elements 10. The spreading cylinder 2 is controlled automatically and is actuated pneumatically or hydraulically.

Figure 5:
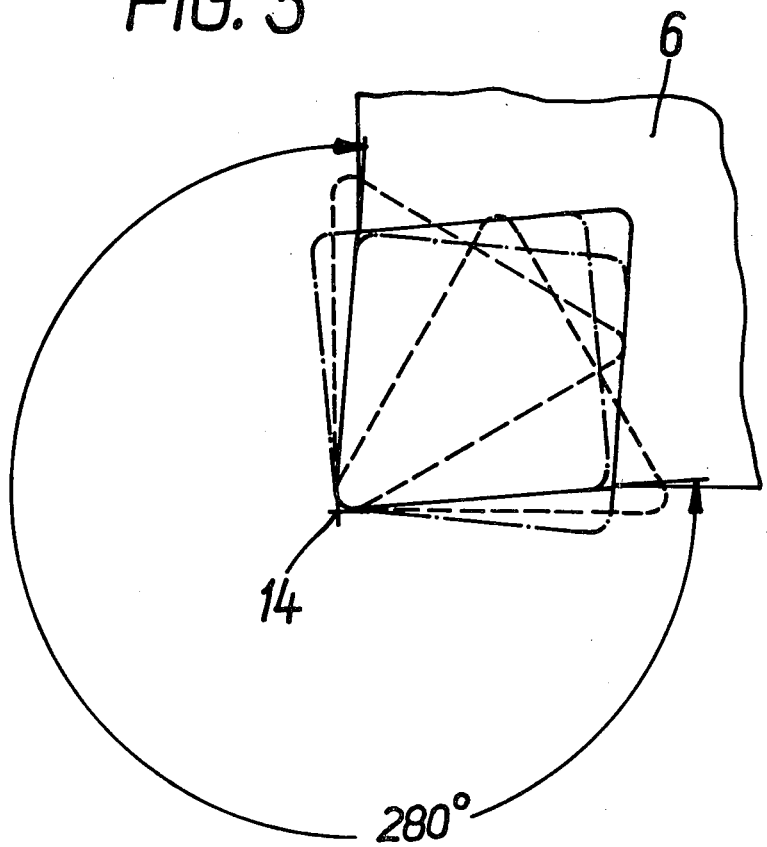
FIG. 5 is a schematic representation of the positioning of various cutting elements in the cutting area according to the invention.

The operation of the apparatus is illustrated in FIG. 1. As shown in FIG. 5, during operation of the apparatus according to the invention, the differently shaped cutting elements 10 disposed on the tool head 6 can be positioned in the cutting area in such a manner that all their cutting points are oriented toward the setting point 14. The setting point 14 is the reference point for programming the apparatus according to the invention, however, as also shown in FIG. 5, because of the various shapes, the reversible cutting plates are able to cover an operating range of 280° in the cutting area.

It will be understood that the above description of the present invention is susceptible to various modifications, changes and adaptations and the same are intended to be comprehended within the meaning and range of equivalents of the appended claims.

What is claimed is:

1. A system for exchanging a cutting element in a machine tool having a rotary shaft, comprising:
    (a) a tool holder mounted on the shaft and having a recess including a support surface;
    (b) a plurality of generally flat tool heads; each tool head having
        (1) a bottom face adapted for a face-to-face contact with said support surface of said tool holder;
        (2) a top face being parallel to said bottom face;
        (3) a recess provided in said top face and including a support surface extending generally parallel to said bottom and top faces; and
        (4) a throughgoing bore spaced from the recess of said tool head and having an axis perpendicular to said bottom and top faces, said throughgoing bore having open ends on said bottom and top faces;
    (c) a cutting element disposed in said recess of each said tool head;
    (d) first clamping means supported in each said tool head for clamping respective said cutting element against the support surface of the tool head;
    (e) second clamping means for removably clamping a selected said tool head against said support surface of said recess of said tool holder;
    (f) a magazine positioned spaced from said tool holder and having a plurality of locations each receiving, in a side-by-side arrangement, a separate tool head together with said cutting element attached to said tool head; and
    (g) a spreading cylinder means movable in at least three directions transverse to one another and having a spreadable component for introduction into said bore of the selected said tool head in a direction perpendicular to said bottom and top face of the tool head and for grasping said selected tool head by expansion of said spreadable component in said bore of said selected tool head and for transporting said selected tool head from said magazine into said recess of said tool holder and for transporting an earlier-selected tool head from said tool holder to said magazine.

2. The system of claim 1, wherein each said tool head further comprises an abutment plate disposed between said support surface of said tool head and said cutting element.

3. The system of claim 1 further comprising an abutment piece disposed in said recess of said tool holder between said tool holder and said tool head.

4. The system of claim 2, 3 or 1 wherein said second clamping means engages into said bore of said tool head to clamp said tool head to said tool holder.

* * * * *